No. 795,705. PATENTED JULY 25, 1905.
R. C. KIMBALL.
GOVERNOR FOR ENGINES.
APPLICATION FILED AUG. 3, 1904.

2 SHEETS—SHEET 1.

Witnesses
Inventor
R. C. Kimball
Attorneys

No. 795,705.  
PATENTED JULY 25, 1905.  
R. C. KIMBALL.  
GOVERNOR FOR ENGINES.  
APPLICATION FILED AUG. 3, 1904.
2 SHEETS—SHEET 2.
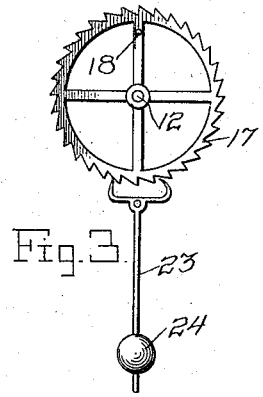
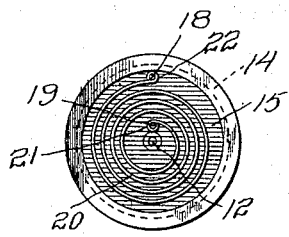
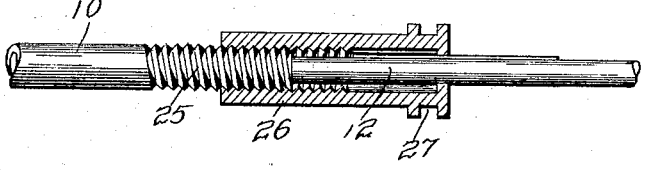
Witnesses  
Inventor  
R. C. Kimball

UNITED STATES PATENT OFFICE.

RAYMOND C. KIMBALL, OF MILLBANK, SOUTH DAKOTA.

GOVERNOR FOR ENGINES.

No. 795,705.　　　　Specification of Letters Patent.　　　　Patented July 25, 1905.

Application filed August 3, 1904. Serial No. 219,394.

*To all whom it may concern:*

Be it known that I, RAYMOND C. KIMBALL, a citizen of the United States, residing at Millbank, in the county of Grant, State of South Dakota, have invented certain new and useful Improvements in Governors for Engines; and I do hereby declare the following to be a full, clear, and exact description of the invention, such as will enable others skilled in the art to which it appertains to make and use the same.

This invention relates to steam-engine governors, although it will be understood that it may be employed in connection with other specific kinds of motors, the object of the invention being to provide a cheap and efficient construction which will be efficient in its operation and which may be readily adjusted to permit of different speeds under different conditions.

Figure 1:
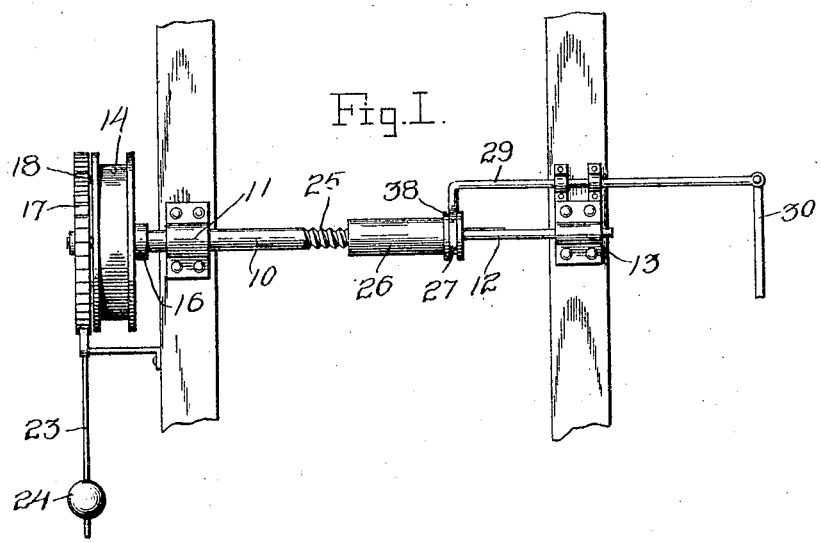
Figure 2:
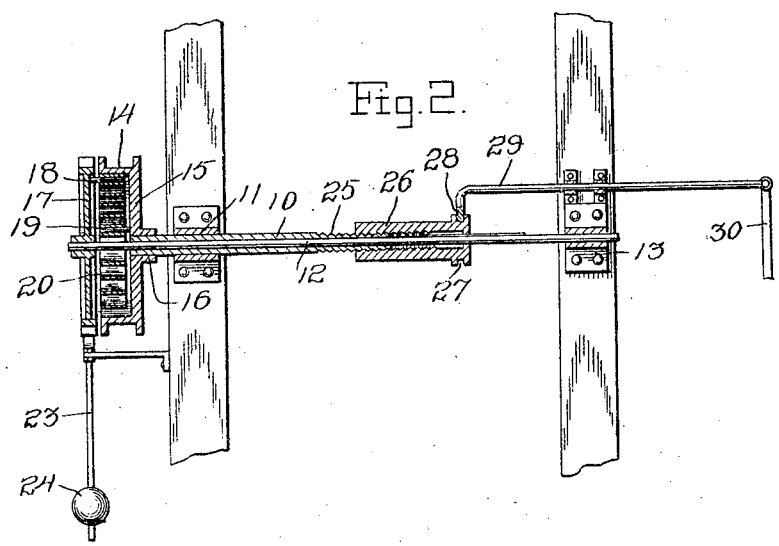

In the drawings forming a portion of this specification, and in which like numerals of reference indicate similar parts in the several views, Figure 1 is an elevation showing the structure embodying the present invention. Fig. 2 is a vertical section taken longitudinally through the structure shown in Fig. 1. Fig. 3 is a view showing the inner face of the escapement-wheel with the pendulum. Fig. 4 is a view showing the hollow face of the pulley-wheel with the spring therein. Fig. 5 is an enlarged detail view of connection between the hollow and escapement shafts.

Referring now to the drawings, the present apparatus comprises a hollow shaft 10, which is mounted in a bearing 11 upon any suitable specific style of support at one end and through which is passed the solid shaft 12, having a bearing in the tubular shaft and in the pillow-block 13 or other specific style of bearing supported in any suitable manner, the shaft 12 projecting at both ends from the shaft 10, as illustrated.

Upon the hollow shaft 10 is mounted a pulley-wheel comprising a grooved rim 14, having a web 15 at one which connects the rim with the hub 16, that is fixed on the hollow shaft 10.

Keyed to the shaft 12 against the open end of the hollow pulley-wheel is an escapement-wheel 17, having a pin 18 near its periphery which projects into the inclosure of the rim 14, while the web 15 of the pulley has a corresponding pin 19, projecting therefrom within the inclosure of the rim 14 and near to the hub 16. A spiral spring 20 has an eye 21 at its inner end which is engaged with the pin 19 and has at its outer end an eye 22, which is engaged with the pin 18, so that if the pulley be rotated at a higher speed than the escapement-wheel the spring will be wound up, and, conversely, the spring will permit of rotation of the pulley at a higher speed than the escapement-wheel for a time. In connection with the escapement-wheel is employed a pendulum 23, having a weight 24, which is adjustable longitudinally thereof to vary the period of vibration of the pendulum in the usual manner.

The end of the shaft 10 opposite to the pulley is provided with external threads 25, which engage the interior threads of one end of a sleeve 26, which at its opposite end is splined to the shaft 12, so that when one shaft is rotated at a higher speed than the other the sleeve will be moved longitudinally in one direction or the other, depending upon which shaft has the higher speed, as will be understood. The sleeve 26 has a circumscribing groove 27, in which is disposed a collar 28, to which is connected a rod 29, attached at its opposite end to a throttle-lever 30.

The pulley is connected with a movable part of the engine through the medium of an ordinary belt, and the pendulum is set to permit of a certain speed of the escapement-shaft 12, corresponding to the desired speed of the engine. If the speed of the engine increases, the pulley gradually runs ahead of the escapement-wheel, which is permitted by the spring 20, through the medium of which motion is conveyed from the pulley to the escapement-shaft, this advance movement of the pulley serving to rotate the threads 25 in the sleeve 26 and to shift the latter longitudinally, with the result that the rod 29 will be moved correspondingly to operate the throttle 30 and reduce the supply of steam to the engine. The speed of the pulley will then decrease so that it will be equal to the speed of the escapement-wheel and escapement-shaft, at which time the sleeve will be shifted longitudinally in the opposite direction to open up the throttle. In this manner a balance will finally be established.

What is claimed is—

1. A governor comprising a hollow exteriorly-threaded shaft, a hollow belt-pulley fixed to the shaft at one end, an escapement-shaft passed from the hollow shaft and projecting at both ends therefrom, a sleeve splined to the escapement-shaft and having internal threads engaged with those of the hollow shaft, a throttle, connections between the sleeve and throttle for moving the latter from the sleeve, an escapement-wheel fixed upon the escapement-shaft, a spiral spring within the pulley attached at one end to the pulley and at the other end to the escapement-wheel, and an adjustable pendulum for the escapement-wheel.

2. In an engine-governor, the combination with a throttle, of an escapement-wheel having a pendulum secured directly thereto, a rotary member adapted for rotation from the engine to be governed, yieldable connections between the rotary member and the escapement-wheel, and means connected with the rotary member and the escapement-wheel and with the throttle and operable by movement of the rotary member and escapement-wheel with respect to each other, for shifting the throttle.

In testimony whereof I affix my signature in presence of two witnesses.

RAYMOND C. KIMBALL.

Witnesses:
F. B. ROBERTS,
H. MIDDLEBROOK.